No. 752,415.

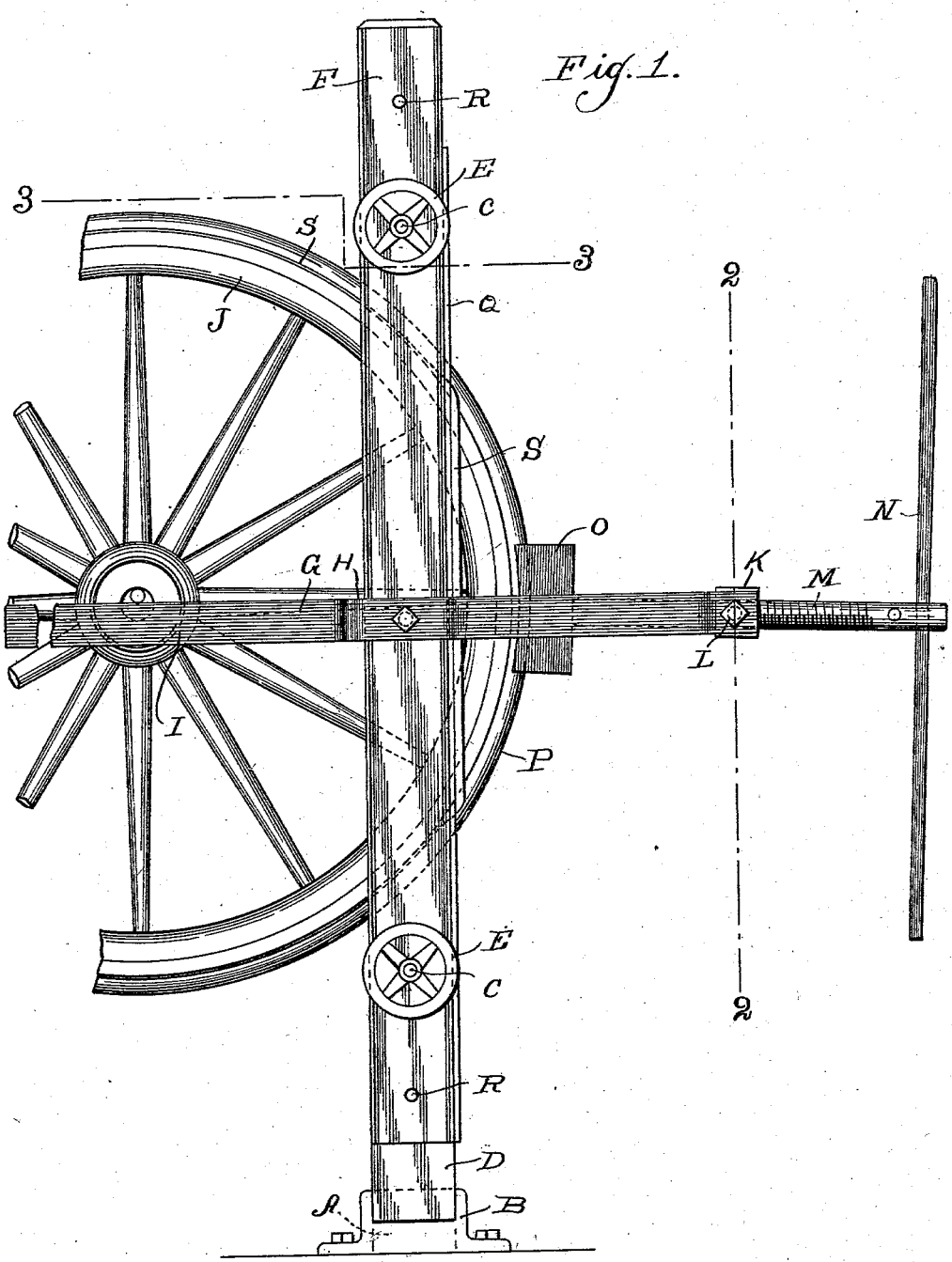

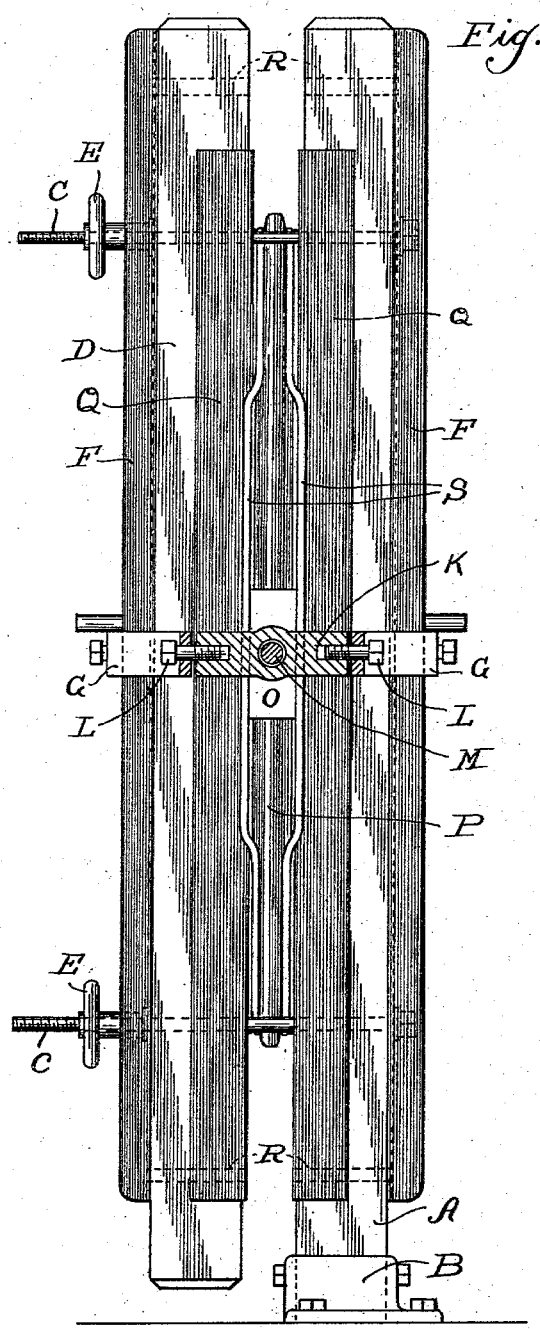
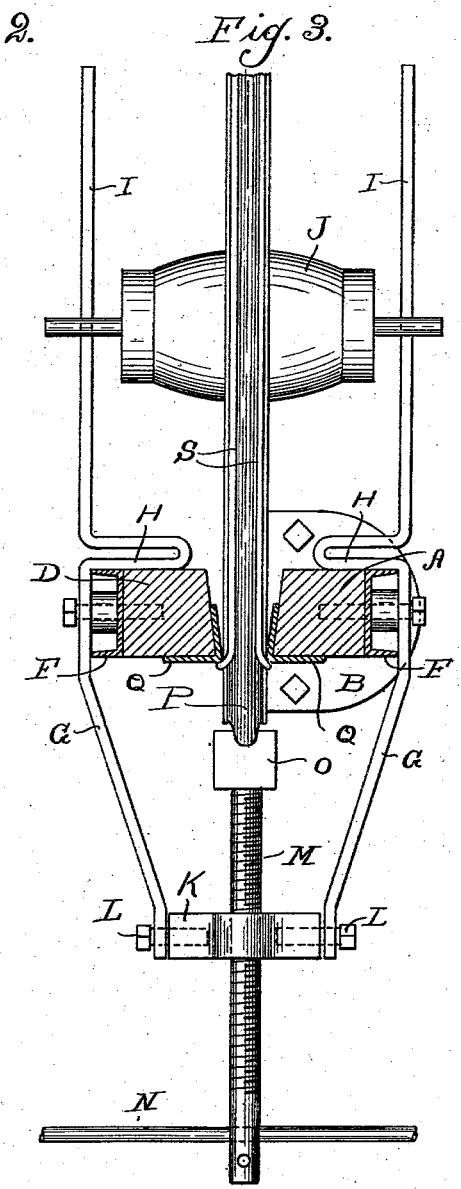

Patented February 16, 1904.

UNITED STATES PATENT OFFICE.

RAYMOND B. PRICE, OF CHICAGO, ILLINOIS.

APPARATUS FOR MOUNTING TIRES.

SPECIFICATION forming part of Letters Patent No. 752,415, dated February 16, 1904.

Application filed June 23, 1903. Serial No. 162,711. (No model.)

*To all whom it may concern:*

Be it known that I, RAYMOND B. PRICE, a citizen of the United States, residing at Chicago, in the county of Cook and State of Illinois, have invented certain new and useful Improvements in Apparatus for Mounting Tires; and I do hereby declare the following to be a full, clear, and exact description of the invention, such as will enable others skilled in the art to which it appertains to make and use the same.

My invention relates to a novel construction in an apparatus for springing retaining-wires over the flanges of the rim or channel of a rubber vehicle-tire to hold said tire in the said rim or channel, the object being to provide a simple and efficient device of this character; and it consists in the features of construction and combinations of parts hereinafter fully described and claimed.

In the accompanying drawings, illustrating my invention, Figure 1 is a side elevation of an apparatus constructed in accordance with my invention. Fig. 2 is a vertical section of same on the line 2 2 of Fig. 1. Fig. 3 is a plan section of same on the line 3 3 of Fig. 1.

My said apparatus is designed to spring endless retaining-bands of smaller diameter than the flanges of the rim or channel of a vehicle-tire over said flanges, so as to cause the same to bear upon the flanges of the rubber tire to hold the same in place in said rim or channel. A tire so held in place is illustrated in my application for Letters Patent of even date herewith.

In said drawings, A indicates a rigid standard suitably mounted in a socket B, secured to the floor. Movably mounted on said standard by means of threaded rods C is a vertical beam D, parallel with said standard A and adapted to be adjusted relatively to the latter to accommodate rims or channels of various widths between the same by means of hand-screws E on said rods engaging said beam D. Said standard A and beam D are each provided with a channel-bar F, secured to their outer faces, which serves to stiffen the same and prevent them from yielding to the pressure to which they are subjected, as will be hereinafter described. Mounted on each of said members A and D at about their middle portions are two bars G, each of which is bent between its ends to form flanges H, which engage one face of each of said members A and D, while the free ends I of said bars serve as supports for a rod on which the wheel J is hung. Between the other ends of said bars G a member K is pivotally mounted by means of the bolts L, and through a central threaded opening in said member K a screw-shaft M passes, which carries a bar or lever N at its outer end and at its inner end is adapted to bear against a shoe O, which is formed to fit and receive the tread of the tire P on said wheel J and to bear against the same. Said shoe is made interchangeable with various shapes and sizes of said shoes adapted to fit tires of various shapes and sizes. The inner edges of said members A and D nearest adjacent said member K are lined with angle-irons Q, having slightly-rounded corners, and which are adapted to take the strain and friction of the operation. The inner faces of said members A and D are preferably beveled or inclined in order to readily accommodate wheels having spokes which diverge from the felly to the hub or are "dished." The said members A and D are also provided with additional openings R to receive the rods C, so as to provide a larger space for the accommodation of wheels of larger diameter.

In operation the retaining-bands S are so mounted on the rim or channel as to lie more than half their circumference within the same, the remainder of said bands projecting beyond said rim or channel. The said members A and D are relatively moved away from each other and the wheel J hung on the supporting-rod and inserted between said members A and D on that side on which the bands S project. Said members A and D are then moved together until the space between them closely accords with the width of the rim or channel, leaving just sufficient room to allow the latter to pass between the same, but insufficient room to permit of the passage of the said retaining-bands S. The shoe O is then applied and the screw-shaft M brought to bear upon said shoe. The said shaft is then revolved and forces the projecting portion of the wheel back through the space between the members A and D. The retaining-bands S are held by said angle-irons Q against passage with said wheel, and are consequently forced inch by inch over the flanges of the rim or channel in an obvious manner until the wheel has passed completely through said passage between said members A and D, when they are completely sprung over said flanges of the rim. The said bands S are made of a very heavy gage wire, having a greater radius than the space between the outermost edge or greatest diameter of the flanges of the rim and the edges of the angle-irons Q, so that as soon as said bands are forced upon the outermost edges of said flanges they will obviously spring over the same. The said bands will not stretch, but will compress the rubber tire wherever they lie in contact with same to an extent sufficient to enable them to be sprung over at their projecting portions. It will be obvious that great power is required to spring said bands over as described, and that consequently the members A and D require to be very rigid in order to prevent the same from yielding and spreading to permit said bands to escape, so that said channel-irons Q or other suitable reinforcing means are essential to proper operation of the device.

This device is obviously exceedingly simple and enables the retaining-bands to be sprung in place with comparative ease and rapidity.

I claim as my invention—

1. In a device of the kind specified the combination with two members adjustable toward and away from each other and adapted to receive part of a wheel between the same, and engage the bands to be sprung on, of devices engaging said wheel to force same bodily from said members against the action of said bands, whereby said bands will be sprung into place, simultaneously with the ejection of said wheel, substantially as described.

2. In a device of the kind specified, the combination with two members adjustable toward and away from each other and adapted to receive part of a wheel between the same, and engage the bands to be sprung on, of devices for imparting relative movement to said wheel and said first-named members to force said wheel and said members apart against the action of said bands, whereby said bands are sprung over and said wheel is simultaneously ejected, substantially as described.

3. In a device of the kind specified, the combination with two practically parallel bars adjustable toward and away from each other and adapted to receive part of the rim of a wheel between the same and engaging the free portions of the retaining-bands to be sprung over said rim, of devices carried by said bars and engaging said wheel for forcing same out of the passage between said bars against the action of said bands, whereby the latter will be sprung over said rim, substantially as described.

4. In a device of the kind specified, the combination with two practically parallel bars adjustable toward and away from each other and adapted to receive part of the rim of a wheel between the same and engaging the free portions of the retaining-bands to be sprung over said rim, of members secured between their ends to said bars and adapted to support said wheel on one side of said bars, and a jack-screw carried by said members at their other ends, said jack-screw being adapted to bear against said wheel on the other side of said bars and force same through the passage between the latter, whereby said bands will be sprung over said rim, substantially as described.

5. In a device of the kind specified, the combination with two practically parallel bars adapted to be adjusted toward and away from each other to receive part of the rim of the wheel between the same, and engaging the overhanging portions of the retaining-bands to be sprung over said rim, of tension members rigidly secured to each of said bars, a member carried by said tension members and movable toward or away from said bars, said last-named member being adapted to engage said wheel and force same through the passage between said bars against the action of said retaining-bands, substantially as and for the purpose set forth.

6. In a device of the kind specified, the combination with two practically parallel bars adapted to be adjusted toward and away from each other to receive part of the rim of the wheel between the same and engaging the overhanging portions of the retaining-bands to be sprung over said rim, of tension members rigidly secured to each of said bars, a revoluble block mounted between said members at their ends, and a jack-screw carried by said block adapted to be brought to bear upon the portion of said wheel projecting through between said bars and force the same back against the action of said retaining-bands, substantially as and for the purpose set forth.

7. In a device of the kind specified, the combination with two practically parallel bars adapted to be adjusted toward and away from each other to receive part of the rim of the wheel between the same and engaging the overhanging portions of the retaining-bands, to be sprung over said rim, of tension members rigidly secured to each of said bars, a revoluble block mounted between said members at their free ends, a jack-screw carried by said block, and interchangeable shoes adapted to be interposed between the end of said jack-screw and the tire of said wheel, said jack-screw being adapted to force said wheel through the passage between said bars, substantially as and for the purpose set forth.

8. In a device of the kind specified, the combination with a standard, and a practically parallel beam movable toward and away from said standard, said members being adapted to receive part of the rim of a wheel between them and engage the overhanging portions of retaining-bands carried by said wheel, of devices carried by said members for supporting said wheel, a jack-screw supported on said members, and interchangeable shoes adapted to be interposed between said jack-screw and the tire of said wheel, said jack-screw being adapted to force said wheel out of the passage between said members against the action of said retaining-bands, substantially as described.

9. In a device of the kind specified, the combination with a standard, and a practically parallel beam movable toward and away from said standard, said members being adapted to receive part of the rim of a wheel between them and engage the overhanging portions of retaining-bands carried by said wheel, angle-irons secured to adjacent corners of said members, and reinforcing devices carried by said members to stiffen same, of a jack-screw supported on said members, and interchangeable shoes adapted to be interposed between said jack-screw and the tire of said wheel, said jack-screw being adapted to force said wheel through the passage between said first-named members, substantially as and for the purpose described.

In testimony whereof I affix my signature in presence of two witnesses.

RAYMOND B. PRICE.

Witnesses:
RUDOLPH WM. LOTZ,
E. F. WILSON.